United States Patent
Xiao et al.

(10) Patent No.: US 11,388,626 B2
(45) Date of Patent: Jul. 12, 2022

(54) BASE STATION, USER EQUIPMENT, AND RELATED METHOD

(71) Applicants: SHARP KABUSHIKI KAISHA, Sakai (JP); FG INNOVATION COMPANY LIMITED, New Territories (HK)

(72) Inventors: Fangying Xiao, Shanghai (CN); Shohei Yamada, Sakai (JP); Renmao Liu, Shanghai (CN)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/620,626

(22) PCT Filed: Jun. 8, 2018

(86) PCT No.: PCT/CN2018/090468
§ 371 (c)(1),
(2) Date: Dec. 9, 2019

(87) PCT Pub. No.: WO2018/228289
PCT Pub. Date: Dec. 20, 2018

(65) Prior Publication Data
US 2021/0144583 A1 May 13, 2021

(30) Foreign Application Priority Data
Jun. 15, 2017 (CN) .......................... 201710454693.5

(51) Int. Cl.
*H04W 76/27* (2018.01)
*H04W 80/02* (2009.01)
(Continued)

(52) U.S. Cl.
CPC ............. *H04W 28/04* (2013.01); *H04L 1/189* (2013.01); *H04W 76/27* (2018.02); *H04W 80/02* (2013.01); *H04W 84/18* (2013.01)

(58) Field of Classification Search
None
See application file for complete search history.

(56) References Cited

U.S. PATENT DOCUMENTS 10,687,248 B2 *  6/2020  Babaei ................. H04L 1/1854
10,750,410 B2 *  8/2020  Vrzic ................... H04W 36/18
(Continued)

FOREIGN PATENT DOCUMENTS

CN   106165503 A   11/2016
CN   102857920 A   6/2017

OTHER PUBLICATIONS

ZTE, "Consideration on the Activation/Deactivation of Data Duplication for CA", 3GPP TSG-RAN WG2 Meeting #98, R2-1704660; Hangzhou, China, May 15-19, 2017.
(Continued)

*Primary Examiner* — Edan Orgad
*Assistant Examiner* — Emmanuel K Maglo
(74) *Attorney, Agent, or Firm* — ScienBiziP, P.C.

(57) ABSTRACT

The present disclosure provides a method in user equipment (UE), the UE operating in a carrier aggregation mode. The method comprises: receiving a Media Access Control (MAC) control element (CE) used for deactivating packet duplication; transmitting data from a Packet Data Convergence Protocol (PDCP) entity to a Radio Link Control (RLC) entity; and transmitting, at a MAC entity, the data only by a cell or cell group associated with the RLC entity in a packet duplication activated state, or by a cell or cell group selected from a set of cells or cell groups preconfigured for the UE.

4 Claims, 11 Drawing Sheets

(51) Int. Cl.
   *H04L 1/18*     (2006.01)
   *H04W 28/04*   (2009.01)
   *H04W 84/18*   (2009.01)

(56) References Cited

U.S. PATENT DOCUMENTS

| | | | |
|---|---|---|---|
| 10,993,192 B2* | 4/2021 | Lin | H04W 52/42 |
| 2015/0181593 A1* | 6/2015 | Kim | H04L 5/0032 |
| | | | 370/329 |
| 2015/0264655 A1 | 9/2015 | Lee et al. | |
| 2015/0282248 A1 | 10/2015 | Lee et al. | |
| 2016/0165627 A1 | 6/2016 | Uemura et al. | |
| 2016/0192427 A1* | 6/2016 | Yun | H04W 76/14 |
| | | | 370/329 |
| 2016/0352493 A1* | 12/2016 | Tan | H04W 52/365 |
| 2017/0164249 A1* | 6/2017 | Uemura | H04W 72/1215 |
| 2017/0318606 A1* | 11/2017 | Lee | H04W 52/365 |
| 2018/0098250 A1* | 4/2018 | Vrzic | H04W 36/18 |
| 2018/0279168 A1* | 9/2018 | Jheng | H04W 28/04 |
| 2018/0279262 A1* | 9/2018 | Babaei | H04W 72/04 |
| 2018/0309660 A1* | 10/2018 | Loehr | H04L 45/24 |
| 2018/0324641 A1* | 11/2018 | Tsai | H04W 36/0069 |
| 2018/0332501 A1* | 11/2018 | Tseng | H04L 1/189 |
| 2018/0368132 A1* | 12/2018 | Babaei | H04L 1/1819 |
| 2018/0368200 A1* | 12/2018 | Jin | H04W 76/15 |
| 2019/0098533 A1* | 3/2019 | Babaei | H04W 72/0413 |
| 2019/0174571 A1* | 6/2019 | Deenoo | H04W 76/11 |
| 2019/0239279 A1* | 8/2019 | Shi | H04L 5/0098 |
| 2019/0253915 A1* | 8/2019 | Joseph | H04W 28/0215 |
| 2019/0253926 A1* | 8/2019 | Kim | H04W 28/06 |
| 2019/0387535 A1* | 12/2019 | Kim | H04W 56/0045 |
| 2019/0394693 A1* | 12/2019 | Kim | H04W 36/06 |
| 2020/0053632 A1* | 2/2020 | Lohr | H04W 76/15 |
| 2020/0092746 A1* | 3/2020 | Baek | H04W 28/085 |
| 2020/0170072 A1* | 5/2020 | Xiao | H04L 1/08 |
| 2020/0187284 A1* | 6/2020 | Turtinen | H04W 36/0069 |
| 2020/0235869 A1* | 7/2020 | Pradas | H04L 1/1896 |
| 2020/0236734 A1* | 7/2020 | Wei | H04W 76/11 |
| 2020/0322094 A1* | 10/2020 | Dudda | H04L 1/1877 |

OTHER PUBLICATIONS

NTT DOCOMO, "New SID Proposal: Study on New Radio Access Technology", 3GPP TSG RAN Meeting #71, RP-160671; Göteborg, Sweden, Mar. 7-10, 2016.

Office Action dated May 20, 2021 in Chinese Application 201710454693.5.

ERICSSON:"Split SRB: Remaining issues", 3GPP Draft; R2-1704428—Split SRB—Remaining Issues, Mobile Competence Centre ; 650, Route Des Lucioles ; F-06921 Sophia-Anti Polis Cedex ; France, vol. RAN WG2, No. Hangzhou; May 15-19, 2017, May 14, 2017 (May 14, 2017), XP051275001, * p. 3, Proposal 2 *.

CATT:"Configuration and activation/deactivation of duplication", 3GPP Draft; R2-1704247, Mobile Competence Centre ; 650, Route Des Lucioies ; F-06921 Sophia-Antipolis Cedex ; France, vol. RAN WG2, No. Hangzhou, China; May 15-19, 2017, (May 14, 2017), XP051274825, "Agreements" box * * p. 1-2, section 2.2 * * p. 2, section 2.3 *.

* cited by examiner

BASE STATION, USER EQUIPMENT, AND RELATED METHOD

TECHNICAL FIELD

The present disclosure relates to the field of wireless communications technologies, and more particularly, to a base station, user equipment, and a related method for transmitting data in a packet duplication deactivated state.

BACKGROUND

In the 3rd Generation Partnership Project (3GPP) RAN #71 plenary meeting in March 2016, a new research project on 5G technical standards (see non-patent literature: RP-160671: New SID Proposal: Study on New Radio Access Technology) was proposed by NTT DOCOMO, and was approved. The goal of the research project is to develop a New Radio (NR) access technology to meet all of the application scenarios, requirements, and deployment environments of 5G. NR mainly has three application scenarios: Enhanced Mobile Broadband Communications (eMBB), massive Machine Type Communications (mMTC), and Ultra Reliable and Low Latency Communications (URLLC).

In the 3GPP RAN2 #96 meeting held in October 2016, it was agreed that research will be performed on multi-connection (including dual-connection) so as to satisfy the reliability requirement of the URLLC. The multi-connection can adopt mechanisms such as packet duplication or link selection. In the 3GPP NR AdHoc meeting held in January 2017, it was agreed that a packet duplication function of a user plane and a control plane is supported in an NR-PDCP entity; functions of a PDCP entity at a transmitting end support packet duplication; and functions of a PDCP entity at a receiving end support deletion of duplicate packets. In the 3GPP RAN2 #97 meeting held in February 2017, it was agreed that the following application is supported in both uplink and downlink conditions: in carrier aggregation, packet duplication is transmitted on two or more logical channels by using Packet Data Convergence Protocol (PDCP) Protocol Data Units (PDUs) and/or Service Data Units (SDUs), and duplicate PDCP PDUs are transmitted through different carriers. In the 3GPP RAN2 #98 meeting held in April 2017, it was agreed that an RRC configuration maps 2 duplicate logical channels to different carriers, i.e., duplicate logical channels cannot be mapped to the same carrier.

It is desirable to solve problems related to deactivating packet duplication in carrier aggregation and multi-connection scenarios that support packet duplication.

SUMMARY OF INVENTION

According to a first aspect of the present disclosure, a method in user equipment (UE) is provided, the UE operating in a carrier aggregation mode. The method comprises: receiving a Media Access Control (MAC) control element (CE) used for deactivating packet duplication; transmitting data from a Packet Data Convergence Protocol (PDCP) entity to a Radio Link Control (RLC) entity; and transmitting, at a MAC entity, the data only by a cell or cell group associated with the RLC entity in a packet duplication activated state, or by a cell or cell group selected from a set of cells or cell groups pre-configured for the UE.

According to a second aspect of the present disclosure, a method in user equipment (UE) is provided, the UE operating in a multi-connection mode. The method comprises: receiving a Media Access Control (MAC) control element (CE) used for deactivating packet duplication; and transmitting data only by a Radio Link Control (RLC) entity or a logical channel corresponding to a master cell group (MCG); or transmitting the data only by an RLC entity or a logical channel corresponding to a secondary cell group (SCG); or transmitting the data by the RLC entities or the logical channels corresponding to the MCG and the SCG in a link selection manner.

In an embodiment, the data is transmitted by an RLC entity or a logical channel corresponding a predefined one of the MCG or the SCG.

In an embodiment, the MAC CE carries indication information indicating whether the data is to be transmitted by the RLC entity or the logical channel corresponding to the MCG or the SCG. The data is transmitted, according to the indication information, by the RLC entity or the logical channel corresponding to the MCG or the SCG.

In an embodiment, the method further comprises: receiving, through Radio Resource Control (RRC) signaling, a data transmission configuration indicating whether the data is to be transmitted by the RLC entity or the logical channel corresponding to the MCG or the SCG in a packet duplication deactivated state. The data is transmitted, according to the data transmission configuration, by the RLC entity or the logical channel corresponding to the MCG or the SCG.

In an embodiment, the MAC CE is received from a MAC entity corresponding to the MCG or the SCG. Whether the data is transmitted by the RLC entity or the logical channel corresponding to the MCG or the SCG is selected according to whether the MAC CE is received from the MAC entity corresponding to the MCG or the SCG; or whether the data is transmitted by the RLC entity or the logical channel corresponding to the MCG or the SCG is selected according to indication information carried in the MAC CE.

In an embodiment, the MAC CE is received from a MAC entity corresponding to only one predefined cell group of the MCG and the SCG; or the method further comprises: receiving, through RRC signaling, an indication identifier indicating a MAC entity for transmitting the MAC CE; and determining, according to the indication identifier, whether the MAC CE is received from the MAC entity corresponding to the MCG or the SCG.

According to a third aspect of the present disclosure, user equipment (UE) is provided, comprising a transceiver, a processor, and a memory, the processor storing instructions executable by the processor so that the E performs the method according to the first or second aspect.

According to a fourth aspect of the present disclosure, a method in a base station is provided, comprising: transmitting a Media Access Control (MAC) control element (CE) used for deactivating packet duplication to user equipment (UE). The MAC CE carries indication information to indicate to the UE whether to transmit data by a Radio Link Control (RLC) entity or a logical channel corresponding to a master cell group (MCG) or a secondary cell group (SCG).

According to a fifth aspect of the present disclosure, a base station is provided, comprising a transceiver, a processor, and a memory, the processor storing instructions executable by the processor so that the base station performs the method according to the fourth aspect.

BRIEF DESCRIPTION OF DRAWINGS

The above-mentioned and other features of the present disclosure will become more apparent through the following detailed description with reference to the drawings, wherein.

DETAILED DESCRIPTION OF EMBODIMENTS

Figure 1:
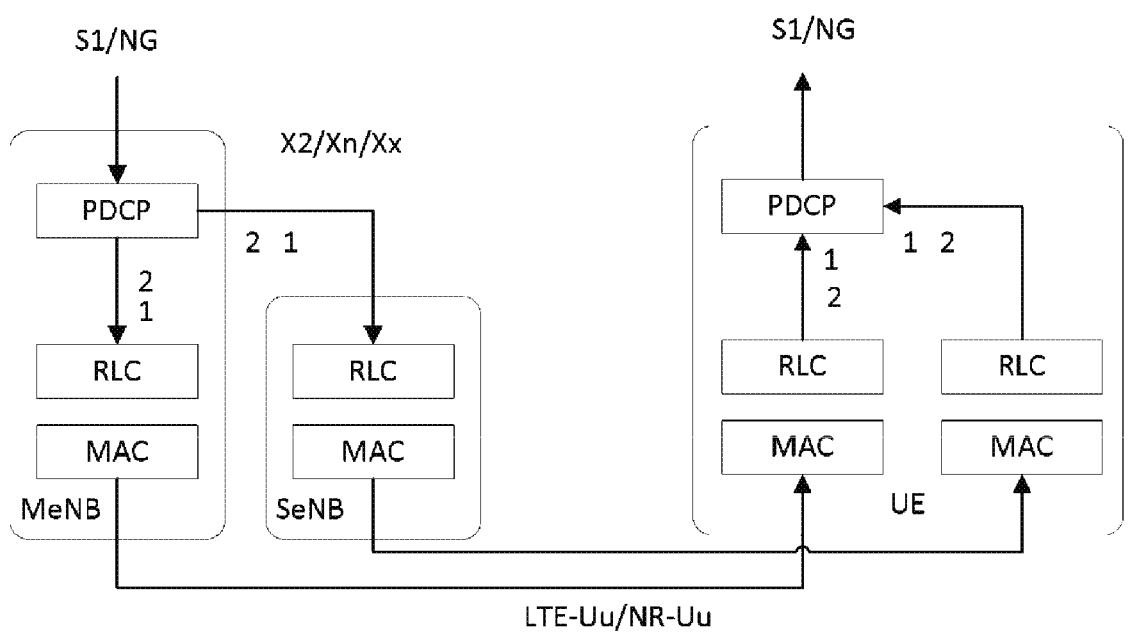
FIG. 1 illustrates a schematic diagram of data transmission of a packet duplication MCG split data bearer (DRB)

The following describes the present disclosure in detail with reference to the accompanying drawings and specific embodiments. It should be noted that the present disclosure should not be limited to the specific embodiments described below. In addition, for simplicity, detailed description of the known art not directly related to the present disclosure is omitted to prevent confusion in understanding the present disclosure.

Some terms involved in the present disclosure are described below. If not specifically indicated, the terms involved in the present disclosure use the definitions herein. The terms given in the present disclosure may be named differently in NR, LTE, and eLTE, but unified terms are used in the present disclosure. When applied to a specific system, the terms may be replaced with terms used in the corresponding system.

RRC: Radio Resource Control.

PDCP: Packet Data Convergence Protocol. In the present disclosure, if not specifically indicated, the PDCP may be a PDCP in NR or LTE or eLTE.

RLC: Radio Link Control. In the present disclosure, if not specifically indicated, the RLC may be a RLC in NR or LTE or eLTE. An RLC entity may be an Unacknowledged Mode (UM) RLC entity or an Acknowledged Mode (AM) RLC entity.

MAC: Medium Access Control. In the present disclosure, if not specifically indicated, the MAC may be a MAC in NR or LTE or eLTE.

DTCH: Dedicated Traffic Channel.
CCCH: Common Control Channel.
DCCH: Dedicated Control Channel.
PDU: Protocol Data Unit.
SDU: Service Data Unit.

In the present disclosure, data received from or transmitted to an upper layer is referred to as an SDU; data transmitted to or received from a lower layer is referred to as a PDU. For example, data received from or transmitted to an upper layer by a PDCP entity is referred to as a PDCP SDU; and data received from or transmitted to an RLC entity by the PDCP entity is referred to as a PDCP PDU (namely, an RLC SDU).

Master base station: Master eNB, denoted as MeNB (a base station corresponding to E-UTRAN or Long Term Evolution (LTE) or eLTE) or MgNB (a base station corresponding to 5G-RAN or NR), which refers to a base station that at least terminates at a control node mobility management entity (which can be denoted as S1-MME) for processing interaction between UE and a core network in multi-connection. In the present disclosure, all the master base stations are denoted as MeNB. It should be noted that all embodiments or definitions applicable to the MeNB are likewise applicable to the MgNB.

Secondary base station: Secondary eNB, denoted as SeNB (a base station corresponding to E-UTR AN or LTE or eLTE) or SgNB (a base station corresponding to 5G-RAN or NR), which refers to a base station that provides extra radio sources for UE and does not serve as an MeNB in multi-connection. In the present disclosure, all the secondary base stations are denoted as SeNB. It should be noted that all embodiments or definitions applicable to the SeNB are likewise applicable to the SgNB.

Primary cell: Primary Cell (PCell), which refers to a cell working at a primary frequency, i.e., a cell in which UE performs an initial connection establishment process or initiates a connection re-establishment process, or a cell designated as a primary cell during a handover process. The cell defined in the present disclosure may also be referred to as a carrier.

Primary secondary cell: Primary Secondary Cell (PSCell), an SCG cell in which UE is instructed to perform random access when performing the SCG change procedure.

Secondary cell: Secondary Cell (SCell), which refers to a cell working at a secondary frequency. The cell can be configured once an RRC connection is established and can be used to provide extra radio resources.

Cell group: Cell Group (CG), which refers to a group of serving cells or carriers associated with a master base station or secondary base station in multi-connection. In the present disclosure, a group of cells associated with a certain logical channel or RLC entity of a packet duplication bearer, or a group of cells providing radio resources or a data transmission service for a certain logical channel or RLC entity of a packet duplication bearer are referred to as a cell group; the cells can be cells configured with uplink carriers. The cells can also be referred to as serving cells. It should be noted that the cells defined in the present disclosure can also be referred to as a set of beams.

Master cell group: Master Cell Group (MCG). For UE not configured with multi-connection, the MCG consists of all serving cells; for UE configured with multi-connection, the MCG consists of a subset (i.e., a group of serving cells associated with an MeNB or MgNB) of serving cells and includes a PCell and 0, 1, or more SCells.

Secondary cell group: Secondary Cell Group (SCG), which refers to a group of serving cells associated with an SeNB or SgNB in multi-connection. The SCG can include one PSCell, and can further include one or more SCells.

Multi-connection: An operation mode of UE in an RRC connected state. In the multi-connection, multiple cell groups are configured; the multiple cell groups include one MCG and one or more SCGs (i.e., the UE, is connected to multiple base stations). If only one MCG (or MeNB or MgNB) and one SCG (or SeNB or SgNB) are configured, the multi-connection is referred to as dual-connection. That is, the UE in a connected state and having multiple receivers and/or transmitters is configured to use E-UTRAN and/or 5G-RAN radio resources provided by multiple different schedulers; the schedulers can be connected by means of non-ideal backhaul or ideal backhaul. The multi-connection defined in the present disclosure includes the dual-connection. A multi-connection data transmission manner includes, but is not limited to, packet duplication and link selection.

DRB: Data Radio Bearer carrying user plane data, or briefly referred to as a data bearer.

SRB: Signalling Radio Bearer. The bearer can be used for transmitting RRC messages and NAS messages, or only used for transmitting RRC messages and NAS messages. SRB can comprise SRB0, SRB1, SRB1bis, and SRB2. Herein, SRB0 is used for RRC messages adopting CCCH logical channels; SRB1 is used for RRC messages adopting DCCH logical channels, where the RRC messages may comprise NAS messages; SRB1 is further used for transmitting the NAS messages prior to establishment of SRB2. SRBbis is used for RRC messages and NAS messages adopting DCCH logical channels prior to secure activation, where the RRC messages may comprise the NAS messages. SRB2 is used for RRC messages and NAS messages adopting DCCH logical channels, where the RRC messages comprise recorded measurement information (or referred to as measurement logs). An SRB can be either an MCG SRB or an SCG SRB. The bearer defined in the present disclosure can be either a DRB or an SRB.

Split DRB: A bearer whose wireless protocol is in both an MeNB (or MgNB) and an SeNB (or SgNB) and uses both MeNB (or MgNB) and SeNB (or SgNB) resources in multi-connection. If a PDCP entity of a split DRB is located at a master base station (i.e., data arrives the master base station first, and is then forwarded by the master base station to a secondary base station, implementing splitting of the data in the master base station), then the split DRB is referred to as an MCG split DRB; if a PDCP entity of a split DRB is located at a secondary base station (i.e., data arrives the secondary base station first, and is then forwarded by the secondary base station to a master base station, implementing splitting of the data in the secondary base station), then the split DRB is referred to as an SCG split DRB. If not specifically stated, the split DRB defined in the present disclosure can be either an MCG split DRB or an SCG split DRB. The embodiments described in the present disclosure are also applicable to scenarios that do not distinguish MCG split DRBs from SCG split DRBs, i.e., the split DRB is a bearer DRB of which a wireless protocol is on an MeNB (or MgNB) and an SeNB (or SgNB) and uses both MeNB (or MgNB) and SeNB (or SgNB) resources.

Split SRB: A bearer of which a wireless protocol is on an MeNB (or MgNB) and an SeNB (or SgNB) and uses both MeNB (or MgNB) and SeNB (or SgNB) resources in multi-connection. If a PDCP entity and/or RRC of a split SRB is located at a master base station (i.e., signaling, which can also be referred to as data, is forwarded by the master base station to a secondary base station, implementing splitting of the signaling in the master base station), then the split SRB is referred to as an MCG split SRB; if a PDCP entity and/or RRC of a split SRB is located at a secondary base station (i.e., signaling, which can also be referred to as data, is forwarded by the secondary base station to a master base station, implementing splitting of the signaling in the secondary base station), then the split SRB is referred to as an SCG split SRB. If not specifically stated, the split SRB defined in the present disclosure can be either an MCG split SRB or an SCG split SRB. The embodiments described in the present disclosure are also applicable to scenarios that do not distinguish MCG split SRBs from SCG split SRBs, i.e., the split SRB is a bearer SRB of which a wireless protocol is on an MeNB (or MgNB) and an SeNB (or SgNB) and uses both MeNB (or MgNB) and SeNB (or SgNB) resources.

The split bearer defined in the present disclosure can be either a split SRB or a split DRB.

Packet duplication: Also referred to as data duplication or packet duplication or PDCP duplication or PDCP PDU duplication or PDCP SDU duplication or PDCP packet duplication (if not specifically stated, the data defined in the present disclosure can be control plane signaling or user plane data, which respectively correspond to signaling of an SRB and data of a DRB). In a multi-connection mode, the same data (or referred to as a packet, i.e., a PDCP PDU or PDCP SDU) is transmitted in serving cells of multiple CGs, i.e., the same data is transmitted by using resources provided by both a master base station (or an MCG) and a secondary base station (or an SCG); or the same data is transmitted respectively to lower layers (or RLC layers) located at the MCG and the SCG; or a PDCP entity transmits the same PDCP PDU to multiple associated lower layer entities (or RLC entities); or the same data is transmitted on multiple different bearers. In a carrier aggregation or single connection mode, a PDCP entity transmits duplicate (or the same) PDCP PDUs to two or more associated RLC entities (or referred to as lower layer entities) and/or logical channels, and a MAC entity transmits the duplicate PDCP PDUs to a receiving end through different carriers (which can also be referred to as cells or serving cells). A PDCP entity of the receiving end is responsible for detecting and deleting the duplicate PDCP PDUs or SDUs.

Link selection: A PDCP entity transmits the same packet (i.e., a PDCP PDU or a PDCP SDU) to only one RLC entity, and different packets can be transmitted through different RLC entities. In carrier aggregation, after PDCP packet duplication is deactivated, the PDCP entity transmits the packet to one of multiple associated RLC entities. In the multi-connection mode, the PDCP entity selects one cell group from configured cell groups for packet transmission, i.e., the PDCP entity transmits the packet to an RLC entity associated with an MCG or to an RLC entity associated with an SCG. Each piece of data only uses resources of an MeNB or an SeNB. In a PDCP PDU link selection multi-connection mode, each PDCP PDU is transmitted to a receiving party via only one RLC entity.

Duplicate logical channel: In the present invention, logical channels which are associated with the same PDCP entity, or are used for transmitting the same data, or correspond to the same packet duplication bearer, are referred to as duplicate logical channels.

Packet duplication bearer: A bearer supporting packet duplication in the carrier aggregation or single connection mode, comprising packet duplication SRBs and packet duplication DRBs. One PDCP entity of the hearer is associated with two or more RLC entities, two or more logical channels, and one MAC entity; a PDCP entity of a transmitting end transmits duplicate (or the same) PDCP PDUs to the two or more RLC entities (or referred to as lower layer entities) and/or two or more logical channels; the duplicate PDCP PDUs are transmitted by the MAC entity to a receiving end through different carriers cells or serving cells); and a PDCP entity of the receiving end deletes the duplicate PDCP PDUs or SDUs from the lower layer entities.

Packet duplication split bearer: A split bearer supporting packet duplication in the multi-connection mode. In the transmission mode, the same data is transmitted over multiple wireless protocols of a split bearer, including a packet duplication MCG split SRB, a packet duplication SCG split SRB, a packet duplication MCG split DRB, and a packet duplication SCG split DRB. If the split bearer is a packet duplication MCG split bearer, then a PDCP entity located at a master base station or an MCG is responsible for packet duplication and/or removal of duplicate packets; if the split bearer is a packet duplication SCG split bearer, then a PDCP entity located at a secondary base station or an SCG is responsible for packet duplication (i.e., transmitting PDCP PDUs to two or more RLC entities) and/or removal of duplicate packets.

FIG. 1 illustrates a schematic diagram of downlink transmission of a packet duplication MCG split DRB conducted between a base station and UE in dual-connection. It should be understood that uplink transmission of a packet duplication MCG split DRB conducted between a base station and UE can adopt the same protocol architecture, in which case data is transmitted from the UE to the base station and the arrow in FIG. 1 is reversed. As shown in FIG. 1, data (e.g., a Packet Data Convergence Protocol data unit (PDCP PDU)) is transmitted over multiple wireless protocols (corresponding to multiple RLC entities associated with the same PDCP entity) of a split DRB by using MeNB and SeNB resources. In a PDCP PDU data duplication multi-connection mode, each PDCP PDU is transmitted to a receiving party via multiple RLC entities. An interface between the MeNB and the SeNB can be denoted as Xn or Xx or X2. The interface can be named differently according to different types of MeNBs and SeNBs. For example, if the MeNB is an LTE eNB and the SeNB is a gNB, then the interface is denoted as Xx; if the MeNB is a gNB and the SeNB is an eLTE eNB, then the interface is denoted as Xn. Correspondingly, a packet duplication MCG split SRB adopts a similar protocol architecture, except that an upper layer entity that transmits data to a PDCP entity is RRC, and the PDCP entity transmits data to an upper layer RRC entity after receiving the data from a lower layer entity.

Figure 2:
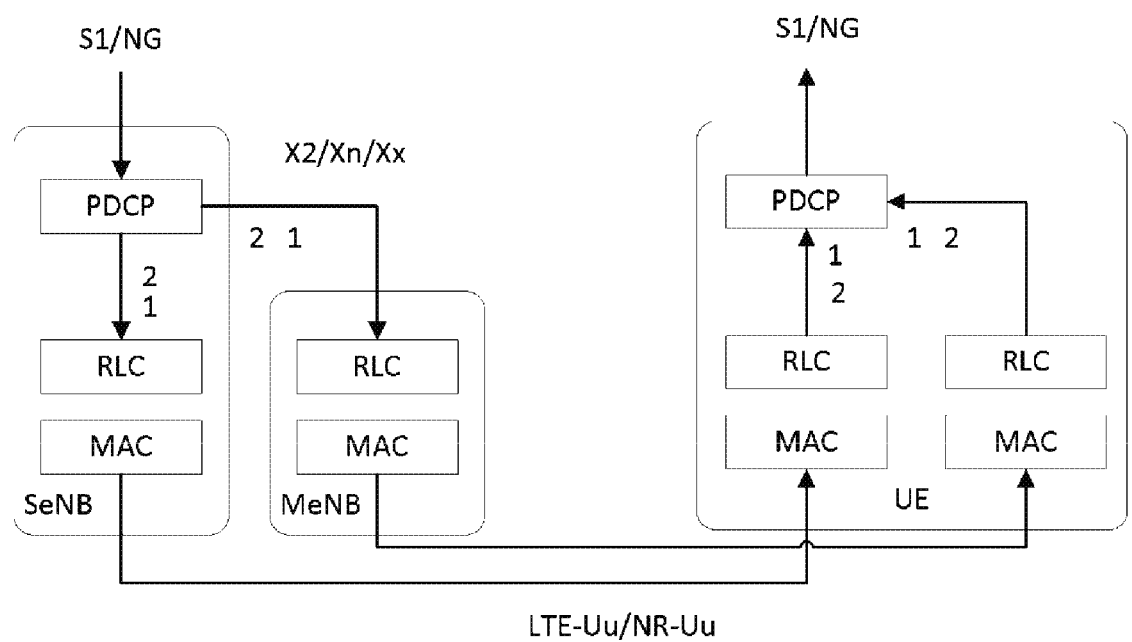
FIG. 2 illustrates a schematic diagram of data transmission of a packet duplication SCG split DRB.

FIG. 2 illustrates a schematic diagram of downlink transmission of a packet duplication SCG split DRB conducted between a base station and UE in dual-connection. It should be understood that uplink transmission of a packet duplication SCG split DRB conducted between a base station and UE can adopt the same protocol architecture, in which case data is transmitted from the UE to the base station and the arrow in FIG. 2 is reversed. As shown in FIG. 2, data (e.g., a PDCP PDU) is transmitted over multiple wireless protocols (corresponding to multiple RLC entities associated with the same PDCP entity) of a split DRB by using MeNB and SeNB resources. In a PDCP PDU data duplication multi-connection mode, each PDCP PDU is transmitted to a receiving party via multiple RLC entities. An interface between the MeNB and the SeNB can be denoted as Xn or Xx or X2. The interface can be named differently according to different types of MeNBs and SeNBs. For example, if the MeNB is an LTE eNB and the SeNB is a gNB, then the interface is denoted as Xx; if the MeNB is a gNB and the SeNB is an eLTE eNB, then the interface is denoted as Xn. Correspondingly, a packet duplication SCG split SRB adopts a similar protocol architecture, except that an upper layer entity that transmits data to a PDCP entity is RRC, and the PDCP entity transmits data to an upper layer RRC entity after receiving the data from a lower layer entity.

Some embodiments of the present disclosure use a scenario where a data packet PDCP PDU or SDU is repeatedly transmitted twice (i.e., one PDCP entity is associated with two RLC entities and/or two logical channels) as an example, but the technical solutions described in the present disclosure are not limited to the scenario where a data packet PDCP PDU or SDU is repeatedly transmitted twice. Those skilled in the art could readily extend the technical solutions to scenarios where a data packet PDCP PDU or SDU is repeatedly transmitted multiple times (i.e., one PDCP entity is associated with multiple RLC entities and/or multiple logical channels).

Figures 3A, 3B:
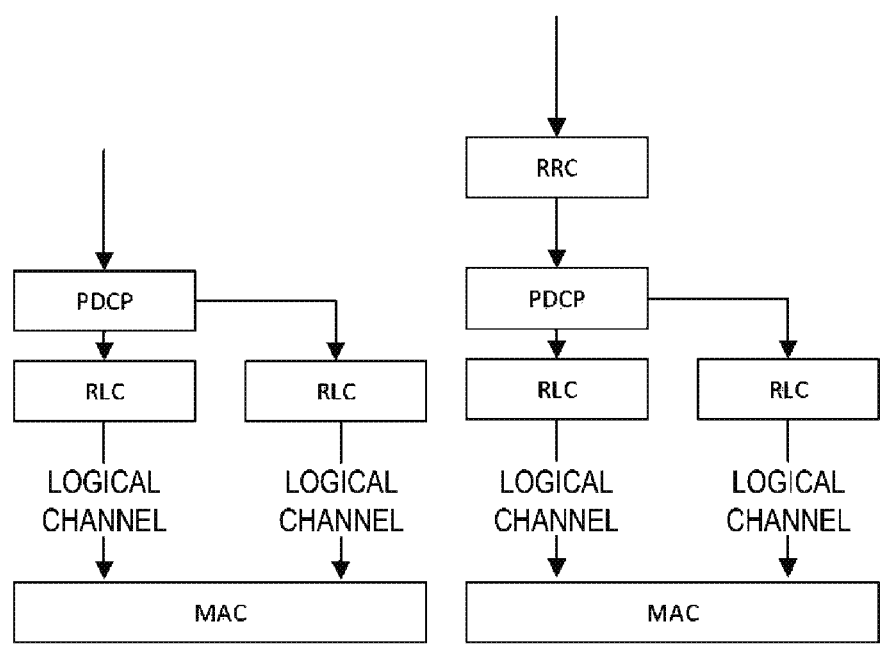
FIG. 3 illustrates a schematic diagram of a protocol architecture of a packet duplication bearer in a carrier aggregation scenario.

FIG. 3 provides a schematic diagram of a protocol architecture of a packet duplication bearer in a carrier aggregation scenario. In a schematic diagram shown in FIG. 3(a), a PDCP entity of one DRB is associated with two RLC entities, two logical channels, and one MAC entity. In a schematic diagram shown in FIG. 3(b), an RRC entity and a PDCP entity of one SRB are associated with two RLC entities, two logical channels, and one MAC entity.

Figures 4A, 4B:
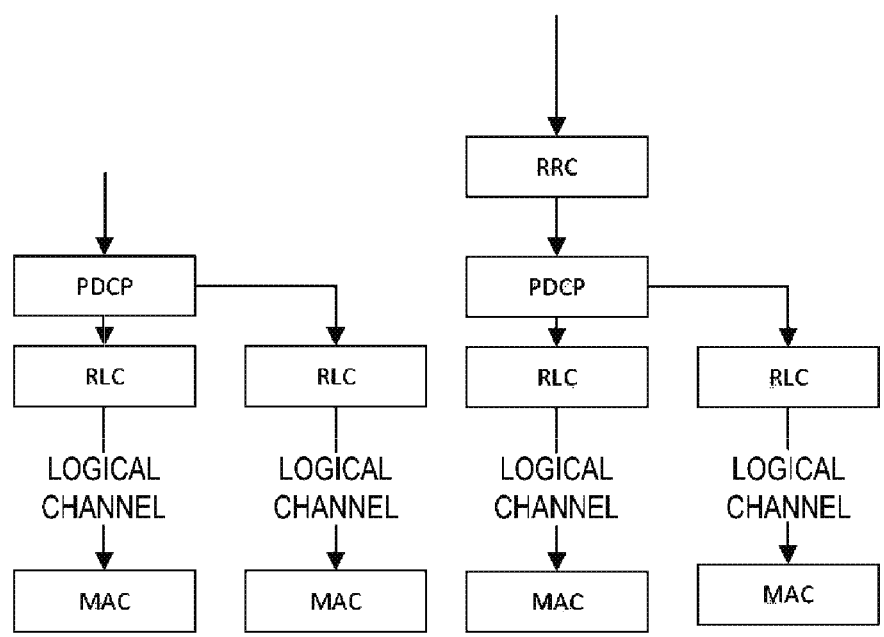
FIG. 4 illustrates a schematic diagram of a protocol architecture of a packet duplication bearer in a dual-connection scenario.

FIG. 4 provides a schematic diagram of a protocol architecture of a packet duplication bearer in a dual-connection scenario. In a schematic diagram shown in FIG. 4(a), a PDCP entity of one DRB is associated with two RLC entities, two logical channels, and two MAC entities. In a schematic diagram shown in FIG. 4(b), an RRC entity and a PDCP entity of one SRB are associated with two RLC entities, two logical channels, and two MAC entities.

In the present invention, a packet duplication bearer or a packet duplication split hearer may be in a deactivated state when configured initially; or PDCP packet duplication for all packet duplication bearers or packet duplication split bearers is deactivated when a deactivation MAC CE is received. Herein, a MAC CE used for deactivating PDCP packet duplication is referred to as a deactivation MAC CE. Since a MAC CE used for activating PDCP packet duplication and a MAC CE used for deactivating PDCP packet duplication can use the same MAC CE, hereinafter, the MAC CE used for deactivating PDCP packet duplication is also referred to as an Activation/Deactivation MAC CE. Whether all packet bearers and/or packet duplication split bearers are activated or deactivated is indicated by one or more fields in the Activation/Deactivation MAC CE; or whether one or more packet bearers and/or packet duplication split bearers are activated or deactivated is indicated by one or more fields in the Activation/Deactivation MAC CE; or whether the MAC CE is an activation MAC CE or a deactivation MAC CE is indicated by one or more fields in the Activation/Deactivation MAC CE. Specifically, there are following several situations:

(1) For UE configured with both packet duplication bearers and packet duplication split bearers, an Activation/Deactivation MAC CE applies to all the packet duplication bearers and packet duplication split bearers. When receiving the Activation/Deactivation MAC CE, the UE activates/deactivates PDCP packet duplication for all the packet duplication bearers and packet duplication split bearers.

(2) Two types of Activation/Deactivation MAC CE are defined for respectively applying to packet duplication bearers and packet duplication split bearers. Preferably, one field is defined in an Activation/Deactivation MAC CE to indicate whether the Activation/Deactivation MAC CE is for packet duplication bearers or for packet duplication split bearers. For UE configured with both packet duplication bearers and packet duplication split bearers, when an Activation/Deactivation MAC CE for packet duplication bearers is received, PDCP packet duplication for all the packet duplication bearers is activated/deactivated; when an activation/deactivation MAC CE for packet duplication split bearers is received, PDCP packet duplication for all the packet duplication split bearers is activated/deactivated.

(3) Indication information for distinguishing bearers is carried in an Activation/Deactivation MAC CE; the indication information can be bearer identifiers or logical channel identifiers or a bitmap corresponding to bearers (each bit in the bitmap corresponds to one packet duplication bearer or packet duplication split bearer; when a corresponding bit in the bitmap is 0, it indicates that PDCP packet duplication for a corresponding bearer is deactivated; when the corresponding bit in the bitmap is 1, it indicates that the PDCP packet duplication for the corresponding bearer is activated; and vice versa) or a bitmap corresponding to logical channels (each bit in the bitmap corresponds to a logical channel associated with one packet duplication bearer or a logical channel associated with a packet duplication split bearer; when a corresponding bit in the bitmap is 0, it indicates that PDCP packet duplication for a corresponding bearer is deactivated; when the corresponding bit in the bitmap is 1, it indicates that the PDCP packet duplication for the corresponding bearer is activated; and vice versa). When receiving the Activation/Deactivation MAC CE, UE activates/deactivates PDCP packet duplication for corresponding bearers according to the indication information in the MAC CE.

It should be noted that in the embodiments of the present invention descried below, PDCP packet duplication can be deactivated in the following conditions: PDCP packet duplication is deactivated when a packet duplication bearer or packet duplication split bearer is initially configured; or PDCP packet duplication is deactivated due to reception of an Activation/Deactivation MAC CE. Due to the different implementations of an Activation/Deactivation MAC CE described above, in the embodiments of the present invention, when receiving an Activation/Deactivation MAC CE, UE activates or deactivates PDCP packet duplication for all packet duplication bearers or packet duplication split bearers, or activates or deactivates PDCP packet duplication for a packet duplication bearer or packet duplication split bearer specified in the MAC CE, according to the received MAC CE.

A logical channel prioritization procedure of a MAC entity or a scheduling procedure of UE follows one or more of the following rules:
1. For a logical channel corresponding to a packet duplication bearer, after PDCP packet duplication is activated, a MAC entity transmits the data from the logical channel corresponding to the packet duplication bearer on uplink resource UL Grant (i.e., new transmission) of its associated cell or a cell in its associated cell group; in other words, the MAC entity cannot transmit the data from the logical channel corresponding to the packet duplication bearer on uplink resource UL Grant of a non-associated cell or a cell not belonging to its associated cell group.
2. For a logical channel corresponding to a packet duplication bearer, after PDCP packet duplication is deactivated, a MAC entity transmits, in UL Grant of all cells, data from the logical channel corresponding to the packet duplication bearer.

It should be noted that in the present disclosure, that the MAC entity transmits the data from the logical channel or bearer through UL Grant can be represented as follows: in a new transmission, the MAC entity multiplexes, according to a multiplexing manner defined by LCP, the data from the logical channel corresponding to the packet duplication bearer or packet duplication split bearer and data from other logical channels to the same MAC PDU based on a Logical Channel Prioritization (LCP) procedure. Optionally, UL Grant from a cell or cell group associated with a packet duplication bearer or packet duplication split bearer can only be used for transmitting data from the packet duplication bearer or the packet duplication split bearer, i.e., on the UL Grant from the cell or cell group associated with the packet duplication bearer or packet duplication split bearer, a MAC entity only multiplexes data to the same MAC PDU according to a multiplexing manner defined by LCP, or transmits data from a logical channel corresponding to the packet duplication bearer or packet duplication split bearer.

Figure 5A:
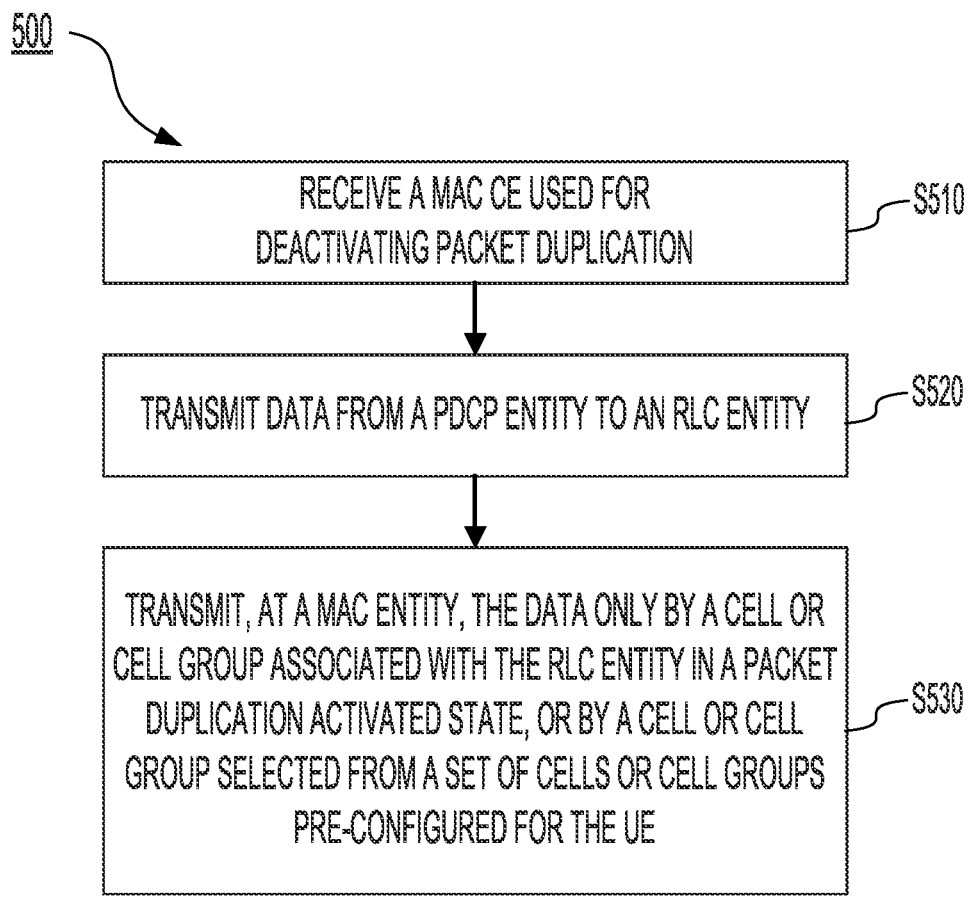
FIGS. 5A-5C illustrate a flowchart and corresponding schematic diagrams of a method in user equipment according to an embodiment of the present disclosure.
Figure 5B:
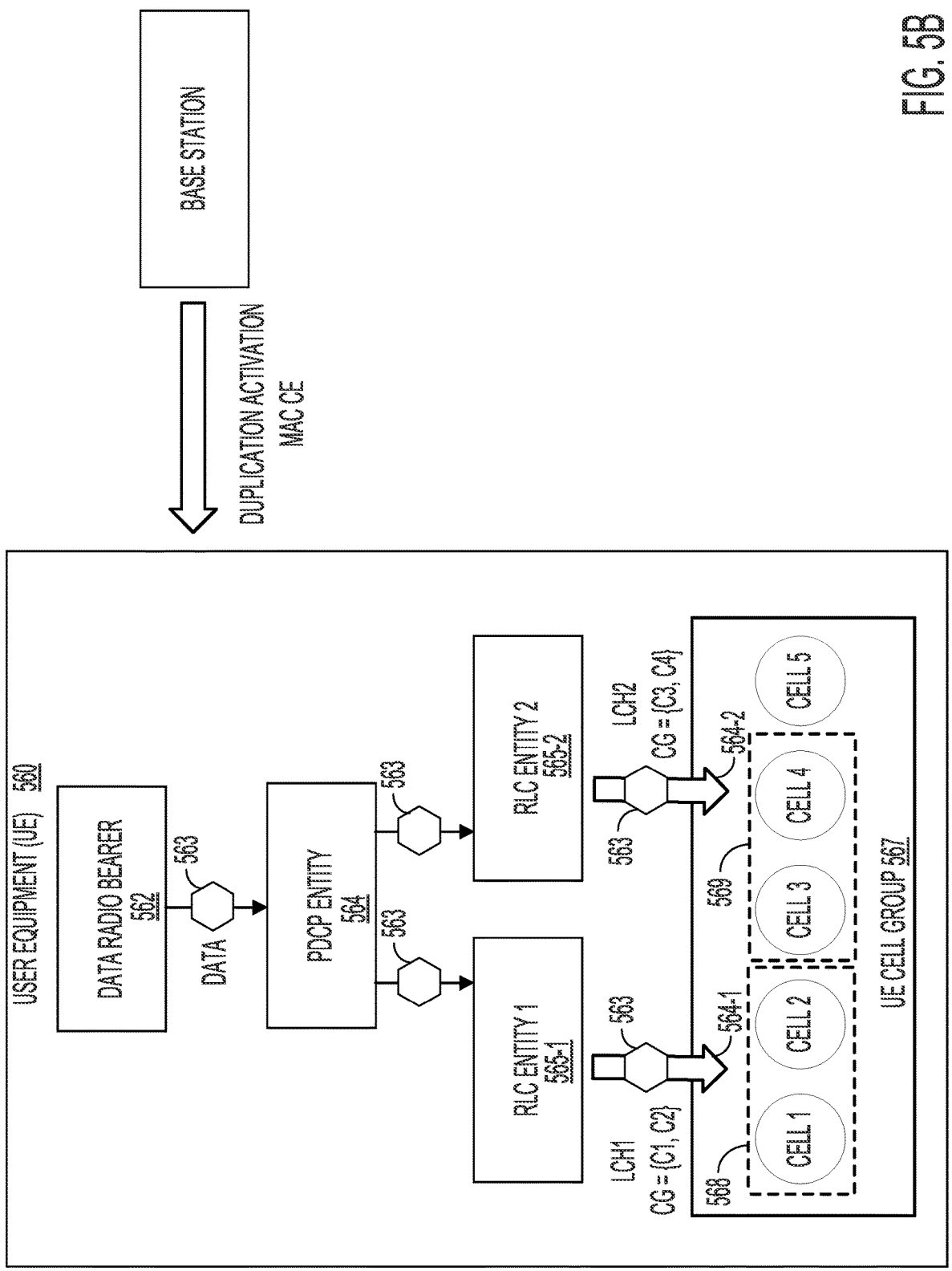
Figure 5C:
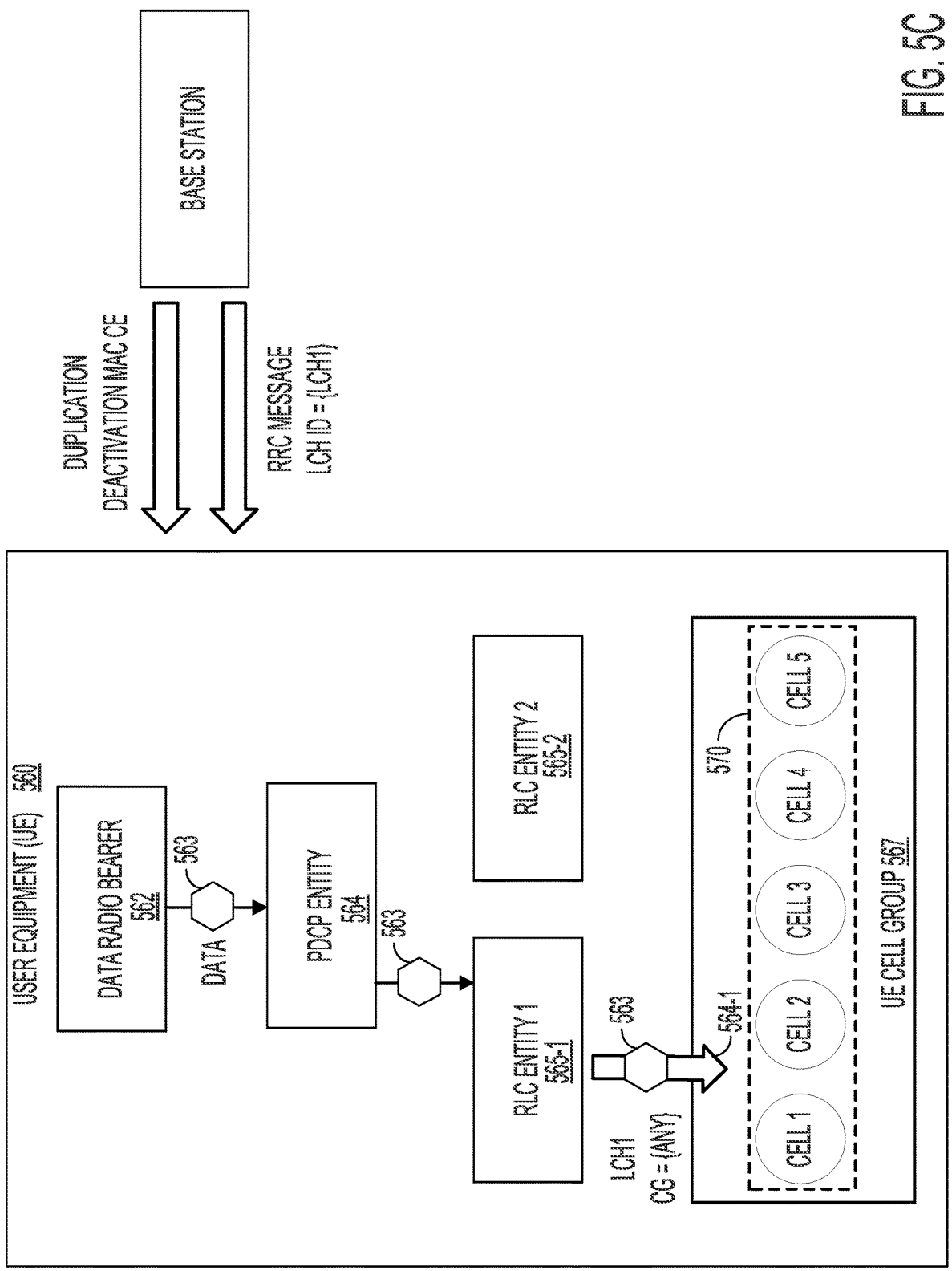

FIGS. 5A-5C illustrate a flowchart and corresponding schematic diagrams of a method 500 in UE 560 according to an embodiment of the present disclosure.

At step S510, a Media Access Control (MAC) control element (CE) used for deactivating packet duplication is received.

At step S520, data 563 is transmitted from a Packet Data Convergence Protocol (PDCP) entity 564 to a Radio Link Control (RLC) entity 565-1.

At step S530, the data 563 is transmitted at a MAC entity only by a cell or cell group associated with the RLC entity 565-1 in a packet duplication activated state, or by a cell or cell group selected from a set of cells or cell groups 567 configured for the UE 560 previously.

Specifically, in one embodiment, after PDCP packet duplication is deactivated, the PDCP entity 564 transmits a PDCP PDU 563 to one RLC entity 565-1, and transmits the PDCP PDU 563 to the MAC entity through a logical channel 564-1. After receiving data 563 from the duplicate logical channel 564-1, the MAC entity transmits the data 563 through a cell or cell group associated with the duplicate logical channel. That is, for a packet duplication bearer 562, the MAC entity cannot transmit the data 563 from the logical channel corresponding to the bearer through an uplink resource (UL Grant) of a cell or cell group that is not associated with the logical channel. For example, a packet duplication bearer DRB1 562 corresponds to two RLC entities RLC1 565-1 and RLC2 565-2 and logical channels LCH1 564-1 and LCH2 564-2, where the RLC1/LCH1 is associated with a cell group CG1={C1, C2} (568), and the RLC2/LCH2 is associated with a cell group CG2={C3, C4} (569). After a packet duplication function of the DRB1 562 is deactivated, all PDCP PDUs 563 can only be transmitted through the RLC1 565-1 by using UL Grant of the cell group associated with the RLC1/LCH1.

In another embodiment, after PDCP packet duplication is deactivated, a PDCP entity 564 transmits a PDCP PDU 563 to an RLC entity 565-1, and transmits the PDCP PDU 563 to a MAC entity through a logical channel 564-1. The MAC entity can transmit the data 563 from the logical channel 564-1 through any uplink resource (UL Grant). That is, after packet duplication is deactivated, data 563 from a corresponding packet duplication bearer 562 or data 563 from a logical channel 564-1 associated with the corresponding packet duplication bearer 562 can be transmitted on UL Grant provided by any cell configured for UE 560; or a MAC entity can multiplex, in any new transmission, according to a procedure defined by LCP, the data 563 from the corresponding packet duplication bearer 562 or the data 563 from the logical channel 564-1 associated with the corresponding packet duplication bearer 562 to a MAC PDU. For example, a cell group 567 for carrier aggregation configured for UE 560 is CG={C1, C2, C3, C4, C5}. A packet duplication bearer DRB1 562 corresponds to two RLC entities RLC1 565-1 and RLC2 565-2 and logical channels LCH1

564-1 and LCH2 564-2, where the RLC1/LCH1 is associated with a cell group CG1={C1, C2} (568), and the RLC2/LCH2 is associated with a cell group CG2={C3, C4} (569). After a packet duplication function of the DRB1 562 is deactivated, all PDCP PDUs 563 can only be transmitted through the RLC1 565-1 by using UL Grant of a PCell and a CG 570.

In yet another embodiment, after PDCP packet duplication is deactivated, a PDCP entity 564 transmits the same PDCP PDU 563 to one of associated RLC entities 565-1, 565-2 and/or logical channels 564-1, 564-2, and the PDCP PDU 563 is transmitted through an associated cell or cell group, i.e., for one PDCP PDU 563, any one of associated RLC entities 565-1, 565-2 can be selected to transmit the PDCP PDU 563. For example, a packet duplication bearer DRB1 562 corresponds to two RLC entities RLC1 565-1 and RLC2 565-2 and logical channels LCH1 564-1 and LCH2 564-2, where the RLC1/LCH1 is associated with a cell group CG1={C1, C2} (568), and the RLC2/LCH2 is associated with a cell group CG2={C3, C4} (569). After a packet duplication function of the DRB1 562 is deactivated, a PDCP PDU 563 can be transmitted through the RLC1 565-1 or the RLC2 565-2. For example, a PDCP PDU 563 with SN=X1 is transmitted to the RLC1 565-1; and a PDCP PDU 563 with SN=X2 is transmitted to the RLC2 565-2.

In a further embodiment, a manner of transmitting a PDCP PDU 563 by a PDCP entity 564 after PDCP packet duplication is deactivated is configured through RRC signaling, i.e., indication information is carried in the RRC signaling, and the indication information is used to indicate a data transmission manner after PDCP packet duplication is deactivated (i.e., through which RLC entity 565-1, 565-2 a PDCP PDU 563 is to be transmitted). The transmission manner can be that all PDCP PDUs 563 are transmitted through one RLC entity 565-1 or logical channel (in this case the value of the indication information is a logical channel identity, indicating that the logical channel is activated or deactivated); or all the PDCP PDUs 563 are transmitted through two RLC entities 565-1, 565-2 or logical channels 564-1, 564-2, but the same PDCP PDU 563 is transmitted to only one of the RLC entities 565-1, 565-2. When receiving an Activation/Deactivation MAC CE, UE 560 deactivates PDCP packet duplication according to the indication information carried in the RRC signaling, and then transmits a PDCP PDU 563 according to a manner defined by the indication information.

Figure 6:
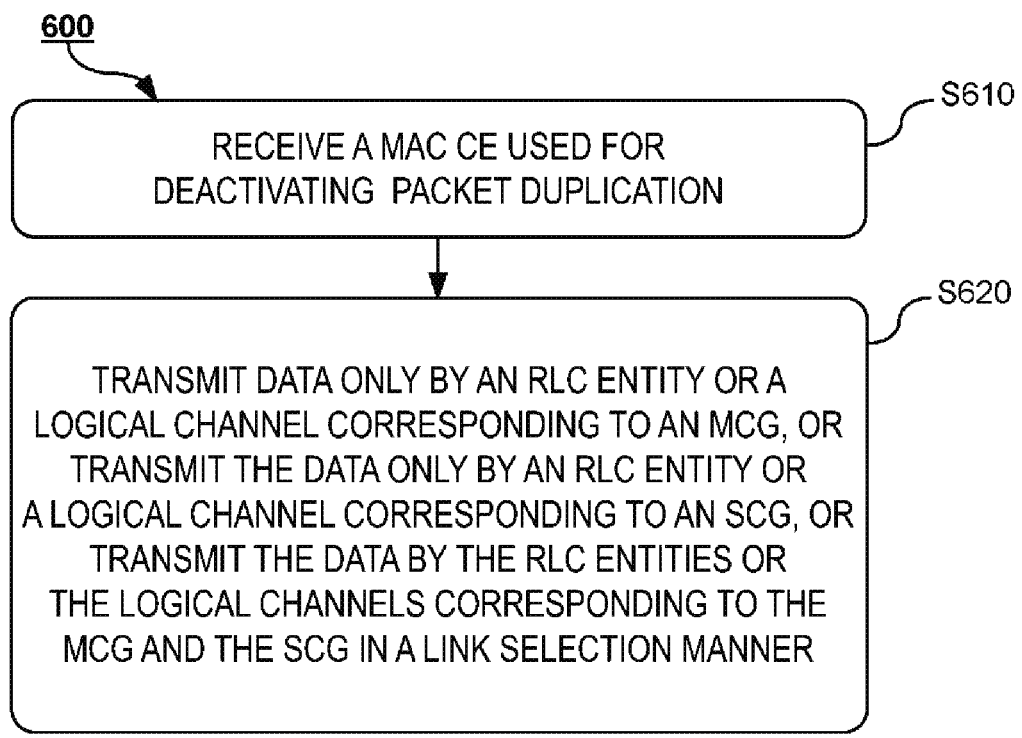
FIG. 6 illustrates a flowchart of a method in user equipment according to another embodiment of the present disclosure.

FIG. 6 illustrates a flowchart of a method 600 in UE according to an embodiment of the present disclosure. The method 600 relates to a data transmission manner after PDCP packet duplication is deactivated in multi-connection. Correspondingly, the UE operates in a multi-connection mode. The method 600 comprises the following steps.

At step S610, a MAC CE used for deactivating packet duplication is received.

At step S620, data is transmitted only by an RLC entity or a logical channel corresponding to an MCG.

Alternatively, at step S620, the data is transmitted only by an RLC entity or a logical channel corresponding to an SCG.

Alternatively, at step S630, the data is transmitted by the RLC entities or the logical channels corresponding to the MCG and the SCG in a link selection manner.

In one embodiment, the data is transmitted by an RLC entity or a logical channel corresponding a predefined one of the MCG or the SCG. Specifically, a data transmission manner after PDCP packet duplication is deactivated is predefined. For example, it is predefined that a PDCP PDU is to be transmitted only by an MCG after PDCP packet duplication is deactivated; or it is predefined that a PDCP PDU is to be transmitted only by an SCG after PDCP packet duplication is deactivated; or it is predefined that a PDCP PDU is to be transmitted only by an MCG or SCG after PDCP packet duplication is deactivated (i.e., after packet duplication is deactivated, a packet duplication split bearer is transmitted in a data transmission manner for a split bearer; the same PDCP PDU is no longer simultaneously transmitted to RLC entities corresponding to the MCG and the SCG, but to only one of them); or it is predefined that a PDCP PDU is to be transmitted only by an RLC entity corresponding to a particular cell group (an MCG or an SCG) after PDCP packet duplication is deactivated, the cell group being a cell group at which a user plane (corresponding to a packet duplication split DRB) or a control plane (corresponding to a packet duplication split SRB) terminates (or a cell group where a corresponding PDCP entity is located).

For example, when receiving an Activation/Deactivation MAC CE, a certain MAC entity of UE deactivates PDCP packet duplication, and transmits a PDCP PDU according to a predefined manner. For example, when receiving an Activation/Deactivation MAC CE, UE deactivates an SCG or a logical channel corresponding to the SCG or an RLC entity corresponding to the SCG. In other words, a PDCP entity transmits a PDCP PDU to a logical channel corresponding to an MCG or an RLC entity corresponding to the MCG or the MCG. For example, when receiving an Activation/Deactivation MAC CE, UE deactivates an MCG or a logical channel corresponding to the MCG or an RLC entity corresponding to the MCG. In other words, a PDCP entity transmits a PDCP PDU to a logical channel corresponding to an SCG or an RLC entity corresponding to the SCG or the SCG.

In another embodiment, the MAC CE carries indication information indicating whether the data is to be transmitted by the RLC entity or the logical channel corresponding to the MCG or the SCG. The data is transmitted, according to the indication information, by the RLC entity or the logical channel corresponding to the MCG or the SCG. Specifically, indication information is carried in an Activation/Deactivation MAC CE to indicate a data transmission manner after PDCP packet duplication is deactivated. For example, it is indicated in a MAC CE that a PDCP PDU is to be transmitted only by an MCG after PDCP packet duplication is deactivated; or it is indicated in a MAC CE that a PDCP PDU is to be transmitted only by an SCG after PDCP packet duplication is deactivated; or it is indicated in a MAC CE that a PDCP PDU is to be transmitted only by an MCG or SCG after PDCP packet duplication is deactivated (i.e., a data transmission manner for a split bearer is adopted; the same PDCP PDU is no longer simultaneously transmitted to RLC entities corresponding to the MCG and the SCG); or it is indicated in a MAC CE that a PDCP PDU is to be transmitted only by an RLC entity corresponding to a particular cell group (an MCG or an SCG) after PDCP packet duplication is deactivated, the cell group being a cell group at which a user plane (corresponding to a packet duplication split DRB) or a control plane (corresponding to a packet duplication split SRB) terminates (or a cell group where a corresponding PDCP entity is located).

When receiving the Activation/Deactivation MAC CE, a certain MAC entity of UE deactivates PDCP packet duplication, and transmits a PDCP PDU according to the indication information carried in the MAC CE. For example, the indication information can be a logical channel identifier or a cell group identifier (e.g., an MCG or an SCG) for correspondingly activating or deactivating a corresponding logical channel or a cell group or a logical channel corresponding to the cell group.

In yet another embodiment, a data transmission configuration is received through RRC signaling, the data transmission configuration indicating whether the data is to be transmitted by the RLC entity or the logical channel corresponding to the MCG or the SCG in a packet duplication deactivated state. The data is transmitted by the RLC entity or the logical channel corresponding to the MCG or the SCG according to the data transmission configuration. Specifically, a data transmission manner after PDCP packet duplication is deactivated is configured through RRC signaling. Indication information is carried in the RRC signaling, the indication information being used for indicating a data transmission manner after PDCP packet duplication is deactivated (i.e., through which RLC entity a PDCP PDU is to be transmitted). The transmission manner can be: a PDCP PDU is to be transmitted only by an MCG (i.e., an RCL entity corresponding to the MCG) after PDCP packet duplication is deactivated; or a PDCP PDU is to be transmitted only by an SCG (i.e., an RCL entity corresponding to the SCG) after PDCP packet duplication is deactivated; or a PDCP PDU is to be transmitted only by an MCG or SCG (i.e., an RCL entity corresponding to the MCG or SCG) after PDCP packet duplication is deactivated (i.e., a data transmission manner for a split bearer is adopted; the same PDCP PDU is no longer simultaneously transmitted to RLC entities corresponding to the MCG and the SCG); or a PDCP PDU is to be transmitted only by an RLC entity corresponding to a particular cell group (an MCG or an SCG) after PDCP packet duplication is deactivated, the cell group being a cell group at which a user plane (corresponding to a packet duplication split DRB) or a control plane (corresponding to a packet duplication split SRB) terminates (or a cell group where a corresponding PDCP entity is located).

When receiving an Activation/Deactivation MAC CE, UE deactivates PDCP packet duplication, and transmits, according to the indication information carried in the received RRC signaling, a PDCP PDU to an RLC entity corresponding to an MCG or an RLC entity corresponding to an SCG according to the manner defined by the indication information.

It should be noted that the RRC signaling defined in the present disclosure can be an RRC reconfiguration message.

In one embodiment, the MAC CE is received from a MAC entity corresponding to the MCG or the SCG. Whether data is transmitted by an RLC entity or a logical channel corresponding to the MCG or the SCG is selected according to whether the MAC CE is received from the MAC entity corresponding to the MCG or the SCG.

Alternatively, whether the data is transmitted by the RLC entity or the logical channel corresponding to the MCG or the SCG is selected according to indication information carried in the MAC CE.

In one example, the MAC CE is received from a MAC entity corresponding to only one predefined cell group of the MCG and the SCG.

In one example, the method 600 further comprises: receiving, through RRC signaling, an indication identifier indicating a MAC entity for transmitting the MAC CE; and determining, according to the indication identifier, whether the MAC CE is received from the MAC entity corresponding to the MCG or the SCG.

A MAC entity for transmitting an Activation/Deactivation MAC CE is explained below with reference to specific examples.

Example 1: Both MCG MAC entities and SCG MAC entities can be used to transmit an Activation/Deactivation MAC CE.

In one embodiment, when receiving an Activation/Deactivation MAC CE, a MAC entity corresponding to a certain cell group deactivates a corresponding duplicate logical channel, i.e., a PDCP entity corresponding to a packet duplication split bearer no longer transmits a PDCP PDU to a logical channel or RLC entity corresponding to the MAC entity. In other words, the PDCP entity corresponding to the packet duplication split bearer transmits data to a logical channel or RLC entity corresponding to another MAC entity; or the MAC entity receiving the Activation/Deactivation MAC CE deactivates a corresponding logical channel or RLC entity. Specifically, if a MAC entity corresponding to an MCG receives an Activation/Deactivation MAC CE for deactivating PDCP packet duplication, then a PDCP entity transmits a PDCP PDU to an RLC entity corresponding to an SCG; if a MAC entity corresponding to an SCG receives an Activation/Deactivation MAC CE for deactivating PDCP packet duplication, then a PDCP entity transmits a PDCP PDU to an RLC entity corresponding to an MCG.

In another embodiment, when receiving an Activation/Deactivation MAC CE, a MAC entity corresponding to a certain cell group deactivates another duplicate logical channel, i.e., a PDCP entity corresponding to a packet duplication split bearer transmits a PDCP PDU to a logical channel or RLC entity corresponding to the MAC entity. In other words, the PDCP entity corresponding to the packet duplication split bearer transmits data to the logical channel or RLC entity corresponding to the MAC entity; or the MAC entity receiving the Activation/Deactivation MAC CE instructs another MAC entity to deactivate its corresponding logical channel or RLC entity. Specifically, if a MAC entity corresponding to an MCG receives an Activation/Deactivation MAC CE for deactivating PDCP packet duplication, then a PDCP entity transmits a PDCP PDU to an RLC entity corresponding to an MCG; if a MAC entity corresponding to an SCG receives an Activation/Deactivation MAC CE for deactivating PDCP packet duplication, then a PDCP entity transmits a PDCP PDU to an RLC entity corresponding to an SCG.

Example 2: It is predefined that an Activation/Deactivation MAC CE is to be transmitted by an MCG MAC entity or an SCG MAC entity.

It can be predefined that UE is to receive an Activation/Deactivation MAC CE only through a MAC entity corresponding to an MCG or SCG; or it is predefined that an Activation/Deactivation MAC CE is to be transmitted by a cell group where a PDCP entity is located; or it is predefined that an Activation/Deactivation MAC CE is to be transmitted by a cell group at which a control plane (corresponding to a packet duplication split SRB) or a user plane (corresponding to a packet duplication split DRB) terminates. For example, when a PDCP entity is located at an MCG, UE receives an Activation/Deactivation MAC CE from a MAC entity corresponding to the MCG; when a PDCP entity is located at an SCG, UE receives an Activation/Deactivation MAC CE from a MAC entity corresponding to the SCG. In the case where the PDCP entity is located at a certain cell group, it indicates that a control plane or a user plane terminates at the corresponding cell group.

It should be noted that the cell group at which the control plane terminates defined in the present invention refers to a cell group connected to a core network MME or a cell group of which a corresponding base station is connected to the MME, e.g., a cell group at which S1-C in LTE/LTE-A or NG-C in NR terminates, or a cell group of a corresponding base station; the cell group at which the user plane terminates defined in the present invention refers to a cell group connected to a gateway or a cell group of which a corresponding base station is connected to the gateway, e.g., a cell group at which S1-U in LTE/LTE-A or NG-U in NR terminates, or a cell group of a corresponding base station.

Example 3: A MAC entity for transmitting an Activation/Deactivation MAC CE is indicated through RRC signaling.

An indication identifier is carried in RRC signaling to indicate a MAC entity for transmitting an Activation/Deactivation MAC CE corresponding to a cell group or a cell group. For example, when the value of the indication identifier is "1" or "setup" or "TRUE" or "MCG" or the indication identifier is carried, an MCG MAC entity transmits an Activation/Deactivation MAC CE; when the value of the indication identifier is "0" or "FALSE" or "SCG" or the indication identifier does not appear, an SCG MAC entity transmits an Activation/Deactivation MAC CE.

The activation of packet duplication (which can also be referred to as PDCP packet duplication or packet duplication bearer packet duplication or PDCP PDU duplication or PDCP SDU duplication or PDCP duplication or packet duplication bearer PDCP duplication or packet bearer PDCP PDU duplication or packet bearer PDCP SDU duplication) as defined in the present disclosure can also be depicted as: a PDCP entity transmits the same PDCP PDU or PDCP SDU to two or more associated lower layer entities (or RLC entities and/or logical channels), i.e., the same PDCP PDU is transmitted through two or more associated cells or cell groups. If the packet duplication is packet duplication split bearer, then a packet duplication function is activated such that the same PDCP PDU is transmitted through MCGs and SCGs. A packet duplication deactivating function can also be depicted as: a PDCP entity is configured to transmit the same PDCP PDU to one of two or more associated lower layer entities (or RLC entities and/or logical channels); or all PDCP PDUs are transmitted by only one of the two or more lower layer entities (or RLC entities and/or logical channels). The packet duplication defined in the present disclosure refers to uplink packet duplication.

Figure 7:
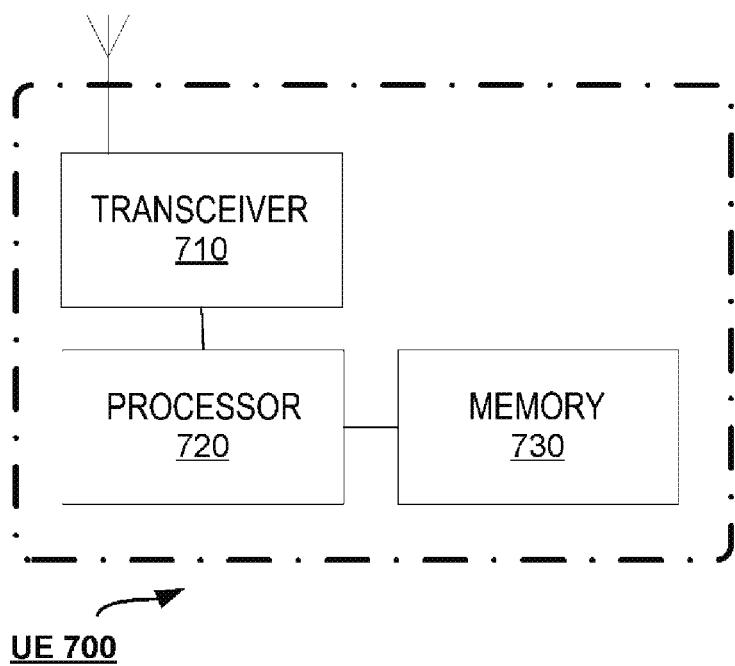
FIG. 7 illustrates a block diagram of user equipment according to an embodiment of the present disclosure.

In accordance with the method 500 or 600 described above, the present disclosure provides UE. FIG. 7 illustrates a block diagram of UE 700 according to an embodiment of the present disclosure. As shown in the figure, the UE 700 comprises a transceiver 710, a processor 720, and a memory 730. The processor 730 stores instructions executable by the processor 720 so that the UE 700 performs the method 500 described above with reference to FIG. 5 or the method 600 described with reference to FIG. 6.

In particular, the processor 730 stores instructions executable by the processor 720 so that the UE 700 receives a MAC CE used for deactivating packet duplication; transmits data from a PDCP entity to an RLC entity; and transmits, at a MAC entity, the data only by a cell or cell group associated with the RLC entity in a packet duplication activated state, or by a cell or cell group selected from a set of cells or cell groups pre-configured for the UE.

Alternatively, the processor 730 stores instructions executable by the processor 720 so that the UE 700 receives a MAC CE used for deactivating packet duplication; and transmits data only by an RLC entity or logical channel corresponding to an MCG; or transmits the data only by an RLC entity or logical channel corresponding to an SCG; or transmits the data by the RLC entities or the logical channels corresponding to the MCG and the SCG in a link selection manner.

In an embodiment, the data is transmitted by an RLC entity or a logical channel corresponding a predefined one of the MCG or the SCG.

In an embodiment, the MAC CE carries indication information indicating whether the data is to be transmitted by the RLC entity or the logical channel corresponding to the MCG or the SCG. The data is transmitted, according to the indication information, by the RLC entity or the logical channel corresponding to the MCG or the SCG.

In an embodiment, the method further comprises: receiving, through RRC signaling, a data transmission configuration indicating whether the data is to be transmitted by the RLC entity or the logical channel corresponding to the MCG or the SCG in a packet duplication deactivated state. The data is transmitted, according to the data transmission configuration, by the RLC entity or the logical channel corresponding to the MCG or the SCG.

In an embodiment, the MAC CE is received from a MAC entity corresponding to the MCG or the SCG. Whether the data is transmitted by the RLC entity or the logical channel corresponding to the MCG or the SCG is selected according to whether the MAC CE is received from the MAC entity corresponding to the MCG or the SCG; or whether the data is transmitted by the RLC entity or the logical channel corresponding to the MCG or the SCG is selected according to indication information carried in the MAC CE.

In an embodiment, the MAC CE is received from a MAC entity corresponding to only one predefined cell group of the MCG and the SCG; or the method further comprises: receiving, through RRC signaling, an indication identifier indicating a MAC entity for transmitting the MAC CE; and determining, according to the indication identifier, whether the MAC CE is received from the MAC entity corresponding to the MCG or the SCG.

Figure 8:
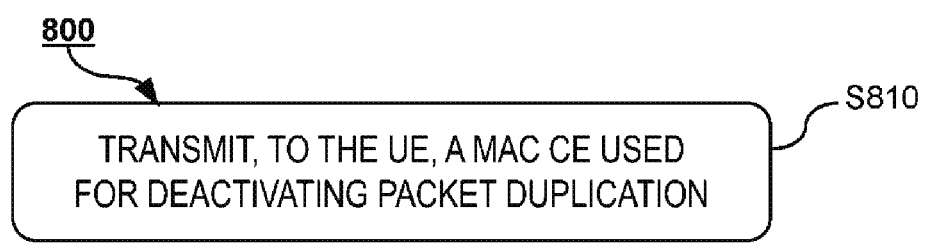
FIG. 8 illustrates a flowchart of a method in a base station according to an embodiment of the present disclosure.

The present disclosure further provides a method in a base station. FIG. 8 illustrates a flowchart of a method 800 in a base station according to an embodiment of the present disclosure. As shown in the figure, the method 800 comprises the following steps.

At step S810, a MAC CE used for deactivating packet duplication is transmitted to UE, The MAC CE carries indication information to indicate to the UE whether to transmit data by an RLC entity or a logical channel corresponding to an MCG or an SCG.

Alternatively, a data transmission configuration can be transmitted to the UE through RRC signaling, the data transmission configuration indicating to the UE whether to transmit the data by the RLC entity or the logical channel corresponding to the MCG or the SCG in a packet duplication deactivated state.

Alternatively, an indication identifier indicating a MAC entity for transmitting a MAC CE can be transmitted to the UE through RRC signaling.

Figure 9:
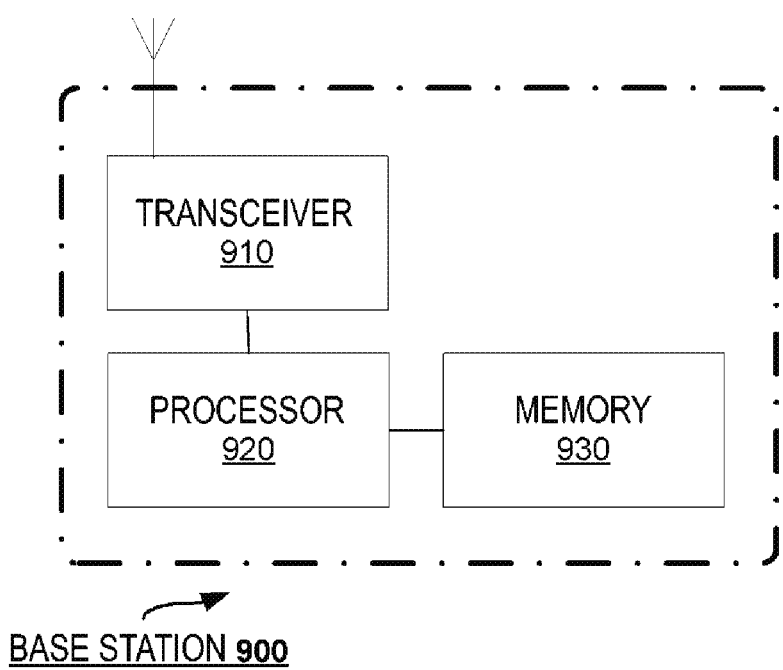
FIG. 9 illustrates a block diagram of base station according to an embodiment of the present disclosure.

In accordance with the method 800 described above, the present disclosure provides a base station. FIG. 9 illustrates a block diagram of a base station 900 according to an embodiment of the present disclosure. As shown in the figure, the base station 900 comprises a transceiver 910, a processor 920, and a memory 930. The processor 920 stores instructions executable by the processor 920 so that the base station 900 performs the method 800 described above with reference to FIG. 8.

Specifically, the processor 920 stores instructions executable by the processor 920 so that the base station 900 transmits, to UE, a MAC CE used for deactivating packet duplication. The MAC CE carries indication information to indicate to the UE whether to transmit data by an RLC entity or a logical channel corresponding to an MCG or an SCG.

Alternatively, the processor 920 can store instructions executable by the processor 920 so that the base station 900 transmits, through RRC signaling, a data transmission configuration to the UE, the data transmission configuration indicating to the UE whether to transmit the data by the RLC entity or the logical channel corresponding to the MCG or the SCG in a packet duplication deactivated state.

Alternatively, the processor 920 can store instructions executable by the processor 920 so that the base station 900 transmits, through RRC signaling, to the UE, an indication identifier indicating a MAC entity for transmitting a MAC CE.

The computer-executable instructions or programs running on the device according to the present invention may be a program that enables the computer to implement the functions of the embodiments of the present invention by controlling the central processing unit (CPU). The program or information processed by the program may be stored temporarily in a volatile memory (e.g., a random access memory (RAM)), a hard disk drive (HDD), a non-volatile memory (e.g., a flash memory), or other memory systems.

The computer-executable instructions or program for implementing the functions of the embodiments of the present invention may be recorded on a computer-readable storage medium. The corresponding functions can be achieved by reading programs recorded on the recording medium and executing them by the computer system. The so-called "computer system" may be a computer system embedded in the device, which may include operating systems or hardware (e.g., peripherals). The "computer-readable storage medium" may be a semiconductor recording medium, an optical recording medium, a magnetic recording medium, a short-time dynamic memory program recording medium, or any other recording medium readable by a computer.

Various features or functional modules of the device used in the above embodiments may be implemented or executed by circuits (e.g., monolithic or multi-piece integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, a controller, a microcontroller, or a state machine. The circuit may be a digital circuit or an analog circuit. When new integrated circuit technologies that replace existing integrated circuits emerge because of the advances in semiconductor technology, one or more embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices installed indoors or outdoors, such as AV equipment, kitchen equipment, cleaning equipment, air conditioner, office equipment, vending machines, and other household appliances, may be used as terminal devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulted from the appropriate combinations of the technical means disclosed in different embodiments are also included within the technical scope of the present invention. In addition, components with the same effect described in the above embodiments may be replaced with one another.

The invention claimed is:

1. A user equipment, comprising:
reception circuitry configured to:
receive a configuration to associate a logical channel corresponding to the user equipment with one or more serving cells associated with a set of serving cells corresponding to the user equipment;
receive a duplication activation media access control (MAC) control element (CE) by which a packet data convergence protocol (PDCP) is activated for a data radio bearer (DRB);
associate data from a logical channel associated with the DRB with the one or more serving cells associated with the logical channel corresponding to the user equipment, wherein the data from the logical channel associated with the DRB is associated with the one or more serving cells as a result of the duplication activation MAC CE;
receive a radio resource control (RRC) message which includes a logical channel identity of a radio link control (RLC) entity from a set of RLC entities corresponding to the user equipment, wherein when the PDCP duplication is deactivated, a PDCP entity associated with the DRB submits a PDCP protocol data unit (PDU) to the RLC entity, and wherein the RLC entity is associated with the logical channel identity;
receive a duplication deactivation MAC CE by which the PDCP is deactivated for the DRB; and
associate the data from the logical channel associated with the DRB with any one or more cells from the set of serving cells according to the RRC message.

2. A base station, comprising:
transmission circuitry configured to:
transmit a configuration to associate a logical channel corresponding to a user equipment with one or more serving cells associated with a set of serving cells corresponding to the user equipment;
transmit a duplication activation media access control (MAC) control element (CE) by which a packet data convergence protocol (PDCP) is activated for a data radio bearer (DRB);
associate data from a logical channel associated with the DRB with a the one or more serving cells associated with the logical channel corresponding to the user equipment, wherein the data from the logical channel associated with the DRB is associated with the one or more serving cells as a result of the duplication activation MAC CE;
transmit a radio resource control (RRC) message which includes a logical channel identity of a radio link control (RLC) entity from a set of RLC entities corresponding to the user equipment, wherein when the PDCP duplication is deactivated, a PDCP entity associated with the DRB submits a PDCP protocol data unit (PDU) to the RLC entity, and wherein the RLC entity is associated with the logical channel identity;

transmit a duplication deactivation MAC CE by which the PDCP is deactivated for the DRB; and
associate the data from the logical channel associated with the DRB with any one or more serving cells from the set of serving cells according to the RRC message.

3. A method performed by a user equipment, comprising:
receiving a configuration to associate a logical channel corresponding to the user equipment with one or more serving cells associated with a set of serving cells corresponding to the user equipment;
receiving a duplication activation media access control (MAC) control element (CE) by which a packet data convergence protocol (PDCP) is activated for a data radio bearer (DRB);
associating data from a logical channel associated with the DRB with the one or more serving cells associated with the logical channel corresponding to the user equipment, wherein the logical channel is associated with the one or more serving cells as a result of the duplication activation MAC CE;
receiving a radio resource control (RRC) message which includes a logical channel identity of a radio link control (RLC) entity from a set of RLC entities corresponding to the user equipment, wherein when the PDCP duplication is deactivated, a PDCP entity associated with the DRB submits a PDCP protocol data unit (PDU) to the RLC entity, and wherein the RLC entity is associated with the logical channel identity;
receiving a duplication deactivation MAC CE by which the PDCP is deactivated for the DRB; and
associating the data from the logical channel associated with the DRB with any one or more serving cells from the set of serving cells according to the RRC message.

4. A method performed by a base station, comprising:
transmitting a configuration to associate a logical channel corresponding to a user equipment with one or more serving cells associated with a set of serving cells corresponding to the user equipment;
transmitting a duplication activation media access control (MAC) control element (CE) by which a packet data convergence protocol (PDCP) is (are) activated for a data radio bearer (DRB);
associating data from a logical channel associated with the DRB with the one or more serving cells associated with the logical channel corresponding to the user equipment, wherein the logical channel is associated with the one or more serving cells as a result of the duplication activation MAC CE;
transmitting a radio resource control (RRC) message which includes a logical channel identity of a radio link control (RLC) entity from a set of RLC entities corresponding to the user equipment, wherein when the PDCP duplication is deactivated, a PDCP entity associated with the DRB submits a PDCP protocol data unit (PDU) to the RLC entity, and wherein the RLC entity is associated with the logical channel identity;
transmitting a duplication deactivation MAC CE by which the PDCP is deactivated for the DRB; and
associating the data from the logical channel associated with the DRB with any one or more serving cells from the set of serving cells according to the RRC message.

\* \* \* \* \*